Nov. 26, 1963 S. C. ROCKAFELLOW 3,112,437

PULSE GENERATING CIRCUIT

Filed Oct. 7, 1960

INVENTOR.
STUART C. ROCKAFELLOW
BY
Woodhams Blanchard and Flynn
ATTORNEYS 3,112,437

PULSE GENERATING CIRCUIT

Stuart C. Rockafellow, Plymouth, Mich., assignor to Robotron Corporation, Detroit, Mich., a corporation of Michigan Filed Oct. 7, 1960, Ser. No. 61,281
7 Claims. (Cl. 323—24)

This invention relates to control circuitry and particularly to the type of control circuitry adapted for limiting the maximum voltage which can be developed between a pair of preselected points.

In certain pulse generating circuits, such as that set forth in my application Serial No. 22,822, there is a tendency for voltages across certain parts of the circuit to exceed predetermined safe values. Particularly, in the circuit set forth in my above-named application, changing conditions of operation will sometimes cause excessive voltages to appear across the capacitor utilized therein and these voltages will sometimes go high enough to damage said capacitor. Therefore, is it desirable to provide protective circuitry which will prevent excessive voltages from being developed.

Accordingly, the objects of the invention are:

(1) To provide a circuit capable of sensing a voltage level and actuating voltage controlling means.

(2) To provide circuitry, as aforesaid, responsive to a voltage difference between two predetermined points and modifying the conductivity of a vacuum tube circuit proportionally thereto.

(3) To provide circuitry, as aforesaid, capable of sensing the magnitude of voltage appearing across a capacitor and actuating a phase shift circuit which controls charging of said capacitor in response thereto.

(4) To provide circuitry, as aforesaid, wherein a phase shift circuit will be utilized to control the magnitude of voltage applied to a capacitor and which will sense the magnitude of voltage actually appearing across said capacitor and adjust a resistive component of said phase shift circuit in response thereto.

(5) To provide control circuitry, as aforesaid, which will prevent the development of a voltage across a capacitor in excess of a predetermined value.

(6) To provide circuitry, as aforesaid, which will be relatively simple to construct and which will be reliable in operation.

Other objects and purposes of the invention will be apparent to persons acquainted with this type of apparatus upon reading the following disclosure and inspecting the accompanying drawings.

*In General*

Figure 1:
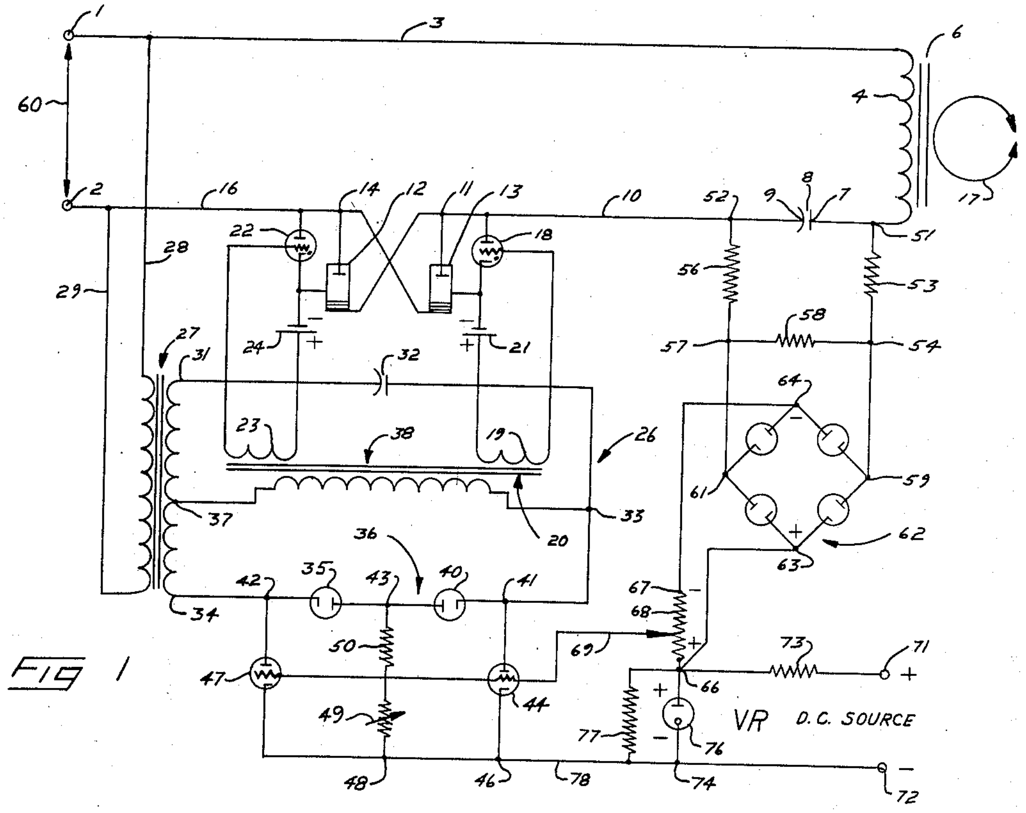
FIGURE 1 is a circuit diagram of an apparatus embodying the invention.

In general, the invention provides means responsive to the voltage difference between a pair of points, as between the terminals of a capacitor, and further means applying said voltage to an adjustable element of a phase shift circuit, such as between the control electrode and the cathode of vacuum tube means where the vacuum tube means desirably functions as a resistive element in a resistance-capacitance phase shift circuit. Thus, the development of a voltage difference, of predetermined magnitude between said points effects a phase shifting of the current and voltage relationships of the supply voltage to said capacitor and thereby limits the maximum voltage which can be developed across said capacitor.

*Detailed Description*

Referring now to the drawings in more detail, there is provided, in the particular circuit utilized to illustrate the invention, a pair of supply terminals 1 and 2 which are connected in any convenient manner to any convenient source of alternating potential, such as an ordinary 60 cycle commercial A.C. source. The terminal 1 is connected through a conductor 3 to one end of a primary winding 4 of a welding transformer 6 whose other end is connected to one terminal 7 of a capacitor 8. The other terminal 9 of the capacitor 8 is connected through a junction point 11 to the cathode of an electric valve, such as an ignitron 12. The junction point 11 is also connected to the anode of another electric valve, such as an ignitron 13. The cathode of ignitron 13 is connected to a junction point 14 and thence by a conductor 16 to the source terminal 2. The junction point 14 is also connected to the anode of the ignitron 12.

The secondary winding of the transformer 6 is connected to any desired load, such as welding electrodes 17.

Conventional firing circuitry is applied to the ignitors of ignitrons 12 and 13. In this instance the firing circuitry for ignitron 13 comprises a suitable firing tube, such as thyratron 18 whose anode is connected to the line 10 and whose cathode is connected to the ignitor of the ignitron 13. The control electrode of the thyratron 18 is connected through a secondary winding 19 of a firing transformer 20 to one side of a suitable source 21 of D.C. biasing potential, such as a battery, whose other side is connected to the cathode of said thyratron. The ignitron 12 is provided with a similar thyratron 22 whose anode is connected to the conductor 16 and whose cathode is connected to the ignitor of said ignitron 12. The control electrode of said thyratron 22 is connected through a secondary winding 23 of the firing transformer 20 to a source 24 of biasing D.C. potential, such as a battery, and thence to the cathode of said thyratron.

There is provided a phase shift circuit 26 which includes a transformer 27 whose primary winding is connected by conductors 28 and 29 to the conductors 3 and 16 and whose secondary winding is connected at one end 31 through a capacitor 32 to a terminal 33. The other end 34 of said secondary winding is connected through a controllable resistance unit 36 to said terminal 33. The primary winding 38 of the transformer 20 is connected between terminal 33 and a center tap 37 on the secondary winding of transformer 27.

Returning now to the resistance unit 36, this may be of any form responsive to voltage magnitude and one convenient type thereof is illustrated in my Patent No. 2,726,356. Briefly, however, for convenient reference herein the resistance unit 36 includes junction points 41 and 42 which constitute the input and output terminals of said resistance unit. Rectifiers 35 and 40, which are shown as diodes, are connected in opposite polarity between said junction points 41 and 42 and have a further junction point 43 located therebetween. The junction point 41 is connected to the anode of the vacuum tube 44 whose cathode is connected to a junction point 46. The junction point 42 is connected to the anode of a vacuum tube 47 whose cathode is connected through a junction point 48 to the junction point 46. An adjustable resistance 49 and a fixed resistance 50 are connected in series between the junction points 43 and 48.

Thus far, the description has dealt with only a pulse producing circuit of the type shown and described in my application Serial No. 22,822, and subject only to the provision of a suitably controlled potential between the control electrodes of said vacuum tubes 44 and 47 and the cathodes thereof. The subject matter of the present invention deals with suitable means for applying such voltage.

Turning now to the circuitry embodying the present invention, there are provided sensing terminals 51 and 52 located at either side of the capacitor 8 and constituting the points between which the voltage is to be taken for control purposes. The terminal 51 is connected by a resistance 53 to a terminal 54 and the terminal 52 is connected by resistance 56 to a terminal 57. The terminals 54 and 57 are connected by a resistance 58. Said resistances are all of relatively high value but are chosen to provide a manageable voltage between the terminals 54 and 57. For example, if the maximum voltage to be permitted between the terminals 51 and 52 is 3000 volts, then it will be convenient to make the resistances 53 and 56 of 100,000 ohms each and the resistance 58 of 20,000 ohms. This will effect a maximum permissible voltage of 300 volts between the terminals 54 and 57.

The terminals 54 and 57 are connected to the input terminals 59 and 61 of a suitable rectifier unit 62 having output terminals 63 and 64. In this instance said rectifier unit is shown as a conventional bridge rectifier circuit but this is solely a matter of choice and convenience.

The output terminals 63 and 64 are connected to the ends 66 and 67, respectively, of the resistance element 68 of a potentiometer. The slider 69 of the potentiometer is connected to the control electrodes of the vacuum tubes 44 and 47.

A D.C. reference voltage is provided between the terminals 71 and 72. Terminal 71 is connected through a suitable protective resistor 73 to the end 66 of resistance element 68 while terminal 72 is connected to the point 74. A voltage regulator device, such as ordinary voltage regulator tube 76, is connected between end 66 and point 74. A resistance 77 is connected around the voltage regulator tube in the usual manner. The point 74 is connected by the conductor 78 to the terminal 46 of the resistance unit 36.

*Operation*

Figure 2:
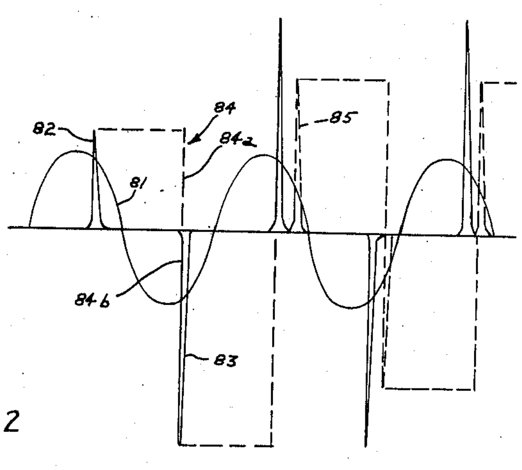
FIGURE 2 is a diagram illustrating both the output of the pulse generating circuitry in the "at rest" condition of the control circuitry and the change in the output of the pulse generating circuit in response to operation of the control circuitry of the invention.

The operation of the basic circuit is set forth in detail in said Serial No. 22,822 but will be reviewed here briefly for convenience in reference. Commencing for example, with a positive voltage appearing on terminal 1 and with ignitron 13 conductive, and following the convention that current flows from positive to negative, current will flow through the primary winding 4 and charge the capacitor 8 with current flowing from the side 9 of said capacitor through the ignitron 13 to the terminal 2. This flow will continue until said capacitor 8 is fully charged at which time said flow will stop. FIGURE 2 illustrates by the line 81 the voltage appearing between the terminals 1 and 2, by the line 82 the voltage appearing across the primary winding 4 and by the broken line 84 the voltage appearing across the capacitor 8.

Upon a pulse of reverse polarity appearing between the terminals 1 and 2, namely, upon the occurrence of a positive potential at the terminal 2, when ignitron 12 is conductive current will flow from said terminal 2 through the ignitron 12 to the capacitor 8 and from said capacitor through the primary winding 4 of the welding transformer 6 back to the terminal 1. Reverse flow of current through the capacitor 8 will first discharge said capacitor and then recharge it in the opposite direction, said discharging being indicated in the portion **84*a* of said line 84 and the recharging of the opposite polarity being indicated by the portion 84*b*** of said line.

This time, however, the potential of said capacitor will be added to the potential between the terminals 1 and 2 to apply a greater potential across the primary winding 4 than appearing in the first pulse above described. This increased potential applied to said primary winding will be repeated with each succeeding pulse so long as said pulses appear close enough together that said capacitor 8 remains charged from one pulse to the next.

In addition, as set forth in said application Serial No. 22,822, the high rate of charging and discharging said capacitor tends to generate further voltage across said winding whereby the pulse 83 is shown as more than twice the voltage of the external source. This is a function, among other things as fully explained in said application Serial No. 22,822, of the duration of said pulse, which in a typical embodiment is one millisecond in length.

This operation repeats for so long as alternating potential continues to appear at the input terminals 1 and 2.

The phase shift circuit 26 controls the time at which the ignitrons 12 and 13 are rendered conductive with respect to the wave form of the alternating potential appearing on said input terminals. In this manner is selected the magnitude of voltage available across the capacitor 8 at the instant the current pulse is caused to flow, the same for practical purposes being here considered as simultaneous with the voltage pulses through the primary winding 4 as indicated by the lines 82 and 83 in FIGURE 2. Thus, where the phase shift circuit 26 is adjusted to cause said pulses to appear at the peak of the input voltages, namely, 90 degrees following the commencement thereof, the applied voltage is at a maximum, the capacitor 8 will be charged to the maximum and the effective voltage appearing on said primary winding 4 and the curernt consequently appearing in the secondary circuit of the transformer 6 will likewise be at a maximum. However, as the phase shift circuit 26 is adjusted to move the point at which said ignitrons become conductive in either direction from the peak of the input sine wave, then the voltage available at the source terminals 1 and 2 at the point at which said ignitrons become conductive progressively diminishes, the charge on capacitor 8 diminishes and both the potential appearing on said primary winding 4 and the current appearing in the secondary circuit of the transformer 6 will diminish. Thus, the voltage on said primary winding and the resulting current in said secondary winding can be closely and accurately controlled by proper control of the phase shift circuit 26.

Turning now to the operation of that portion of the circuit above described as constituting the present invention, it is assumed that the apparatus is starting from a previously inactive condition so that there is no potential across the capacitor 8. This means that no potential exists between the points 54 and 57 and consequently no potential exists between the points 63 and 64 or between the points 66 and 67. Therefore, the positive potential originating at the terminal 71 will be applied to the control electrodes of the vacuum tubes 44 and 47 and this in effect will provide a minimum resistance between the points 41 and 42. However, the fixed resistance 50 will hold said minimum resistance between said points 41 and 42 above a predetermined value and this value is chosen to cause at least a 90 degree phase shift. Thus, with the variable resistor 49 being placed in its minimum resistance setting, and with no voltage at all across the capacitor 8, the current pulses will occur 90 degrees following the commencement of each half cycle, namely, at the peak of each voltage wave appearing between the terminals 1 and 2.

Ignoring for a moment the control circuitry connected to the capacitor 8, it will be recognized that as the variable resistor 49 is adjusted to provide progressively greater resistance between the points 41 and 42, the amount of phase shifting will increase so that the point at which said pulse appears will be moved progressively from the 90 degree point on the voltage wave toward the 180 degree point. Thus, as brought out in detail in connection with my application Serial No. 22,822, causing said current pulse to occur at points on the voltage wave where said voltage is of progressively lesser values, will provide an accurate control over the magnitude of the voltage appearing across the primary winding 4 of the transformer 6 and consequently a control over the magnitude of current appearing in the secondary winding of said transformer 6.

As voltage appears across the capacitor 8, it will develop a voltage between the terminals 63 and 64 and accordingly the voltage between the terminals 66 and 67 which, as shown in FIGURE 1, is sensed oppositely to the voltage between the points 66 and 74. Since the extent of positive voltage on the control electrodes of the vacuum tubes 44 and 47 will not affect the conductivity thereof, the effective resistance between the points 41 and 42 is not altered so long as the voltage between the point 66 and the slider 69 merely opposes but remains less than the voltage between the points 66 and 74. Since the voltage between the points 66 and 74 is fixed, the setting of the slider 69 on the resistance 68 provides a fixed ceiling below which changes in the voltage difference between points 63 and 64 will not change the total resistivity between the points 41 and 42. However, when the voltage difference between the points 51 and 52 exceeds some predetermined amount, such as 3000 volts, then there appears between the points 66 and 67 sufficient feedback voltage that the slider 69 goes negative with respect to the point 74 and the vacuum tubes 44 and 47 add resistance between the points 41 and 42. This phase shifts the pulses appearing in the circuit of the primary winding 4 sufficiently toward the 180 degree point of the supply voltage that the voltage appearing across the capacitor 8 will be reduced. Such phase shifting continues until a balance point is reached and the voltage across the capacitor 8 returns to the predetermined 3000 volts.

It should be noted that in the example above utilized, the voltage between points 54 and 57 can reach as high as 300 volts whereas the voltage between points 66 and 74 is in this example only 105 volts. This insures that ample negative voltage will be available to the slider 69 to effect the desired operation.

Therefore, for so long as the potential on the control electrodes of the tubes 44 and 47 remains positive, the potential applied to the capacitor 8 can be modified freely by adjusting resistance 49. However, when the potential across said capacitor 8 reaches such a level that the potential on the said control electrodes becomes negative, then (as shown by broken line 85 in FIGURE 2) the phase shift circuit will cause the moment of conduction of the ignitrons to change in a direction toward the 180 degree point and the current pulse will occur at a lower voltage point on the sine wave of the external supplied voltage source. This will effect the desired voltage limiting across said capacitor 8.

While one particular embodiment of the invention has been shown for illustrative purposes, it will be recognized that other specific circuits may be devised employing the principles herein set forth and accordingly such circuits will be included within the hereinafter appended claims excepting as said claims may by their own terms expressly require otherwise.

What is claimed is:

1. In a pulse generating circuit including an alternating source, an inductance, a capacitance and a switch all in series with each other, the switch being rendered conductive by phase shift circuitry whose degree of phase shifting is responsive to the magnitude of a potential placed across a selected portion thereof, the improvement which comprises a voltage limiting circuit for controlling the voltage across the capacitor comprising in combination: means including a rectifier connected around the capacitor across which the voltage drop is to be limited for providing at a pair of terminals a D.C. control potential proportional to the potential existing at any given instant across said capacitor;

a source of constant D.C. voltage and means applying same in one polarity across said selected portion of said phase shift circuitry and means applying said control potential across said selected portion in opposition to said constant potential.

2. In a pulse generating circuit including an alternating source, an inductance, a capacitance and a switch all in series with each other, the switch being rendered conductive by phase shift circuitry whose degree of phase shifting is responsive to the magnitude of a potential placed across a selected portion thereof, the improvement which comprises a voltage limiting circuit for controlling the voltage across the capacitor comprising in combination: a high resistance circuit connected around the capacitor across which the voltage drop is to be limited and means including a first pair of terminals and one-way conductive elements for supplying to said pair of last-named terminals a variable D.C. control potential responsive to the magnitude of the voltage appearing across said capacitor;

a source of steady D.C. control potential and a second pair of terminals across which said last-named potential is applied;

means applying said variable control potential to said second pair of terminals in series relationship and of opposite polarity to said steady control potential;

said steady control potential being materially less than the voltage permissible across said capacitor;

two conductors connecting said terminals respectively to the two sides of said selected portion of said phase shift circuit, the magnitude of voltage between the positive side of said variable control potential and the conductor connecting same to said phase shift circuit being quantitatively related to the said steady control potential in such a manner that said last-named conductor will become negative with respect to the other conductor when the voltage across said capacitor reaches said predetermined value.

3. A voltage limiting circuit for use with a pulse generating circuit including an alternating source, an inductance, a capacitance and a switch all in series with each other, the switch being rendered conductive by phase shift circuitry whose degree of phase shifting is responsive to the magnitude of a potential placed across a selected portion thereof, comprising in combination: means including a rectifier connected around the element across which the voltage drop is to be limited for providing at a first pair of terminals a D.C. potential proportional to the potential existing at any given instant across said element;

a second pair of terminals and means applying a steady D.C. reference potential therebetween;

a resistance element and means connecting the first end of said resistance element to the negative one of said first pair of terminals and means connecting the other end of said resistance element to the positive one of said first pair of terminals;

means connecting said last-named end of said resistance element to the positive one of said second pair of terminals;

a conductor connecting the negative side of said second pair of terminals to one side of said selected portion of said phase shift circuitry and a second conductor connecting a selected point on said resistance element to the other side of said selected portion of said phase shift circuitry, all of said parts being so arranged that the voltage between said selected point and the positive terminal of said resistance element is so related quantitatively to said steady reference voltage that said second conductor will become negative at approximately the time that the voltage across said element reaches the maximum predetermined value.

4. A voltage limiting circuit for use with a pulse-generating circuit including an alternating source, an inductance, a capacitance and a switch all in series with each other, the switch being rendered conductive by phase shift circuitry whose degree of phase shifting is responsive to the magnitude of a potential placed across a selected portion thereof, comprising in combination: means providing a steady D.C. control voltage;

variable D.C. control voltage means opposing said steady control voltage, said variable control voltage means being connected so as to be variable in response to the magnitude of voltage at a given time across a selected element of the pulse-generating circuit;

said two control voltages being placed in opposition to each other with their positive sides connected;

first and second conductors connected respectively to the negative side of both of said control voltages and connected across said selected portion of said phase shift circuity;

said control voltages being related quantitatively with respect to each other such that said second conductor becomes negative with respect to said first conductor at approximately the time the voltage on said selected element exceeds the maximum predetermined limit.

5. A pulse supplying circuit, comprising: a source of alternating potential;

a welding transformer having a primary winding;

a capacitor;

a pair of back-to-back connected electric valves connected in series with said capacitor and said primary winding to said source;

phase shift means connected for rendering said valves conductive on opposite half-cycles of said source, said phase shift means including a voltage responsive adjustable means for adjusting the degree of phase shift;

a voltage sensing circuit connected across said capacitor for giving a control voltage proportional to the charge on said capacitor;

means connecting said voltage sensing circuit to said voltage responsive adjustable means so that the degree of phase shift is responsive to the charge on said capacitor.

6. A pulse supplying circuit according to claim 5 wherein said voltage sensing circuit includes rectifier means connected to opposite sides of said capacitor for providing a D.C. output whose value is proportional to the charge on said capacitor;

a source of constant D.C. potential connected to said voltage responsive adjustable means for normally maintaining said phase shift circuit in one condition of phase shift;

means connecting said rectifier means to said voltage responsive adjustable means so that the D.C. output of said rectifier means is in opposition to said constant D.C. potential source whereby said D.C. output will overcome said constant D.C. potential and adjust said voltage responsive adjustable means to thereby change the degree of phase shift when the charge on said capacitor exceeds a predetermined level.

7. A pulse supplying circuit according to claim 6, in which said voltage responsive adjustable means comprises electric valve means having control electrode means for controlling the conductivity thereof;

resistance means having a tap and means connecting said tap to said control electrode means;

said sensing circuit including voltage divider means between said capacitor and said rectifier means whereby the voltage supplied to said rectifier means is less than but is proportional to the charge on said capacitor;

means connecting said rectifier means across said resistance means;

means connecting the positive side of said constant D.C. source to one end of said resistance means, said positive side of said rectifier means also being connected to said one end of said resistance.

References Cited in the file of this patent

UNITED STATES PATENTS

| | | |
|---|---|---|
| 2,207,577 | Buell | July 9, 1940 |
| 2,458,644 | Ringer | Jan. 11, 1949 |